E. M. SAUDER.
FRONT WHEEL DRIVE.
APPLICATION FILED SEPT. 5, 1916.
1,224,504.
Patented May 1, 1917.
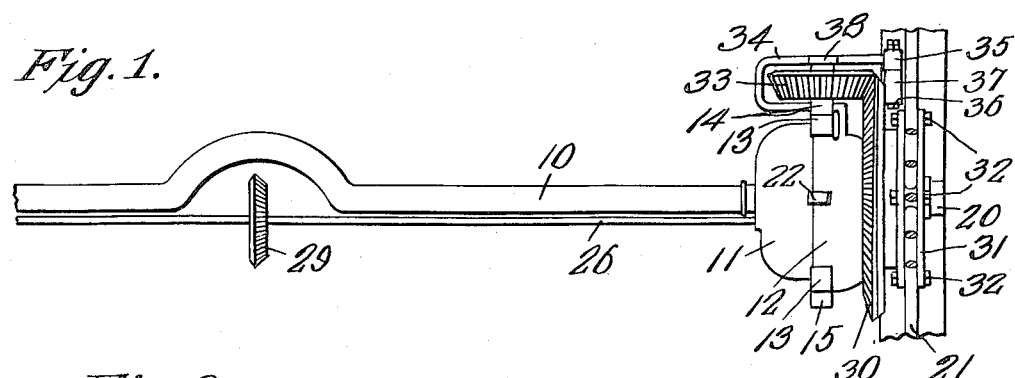
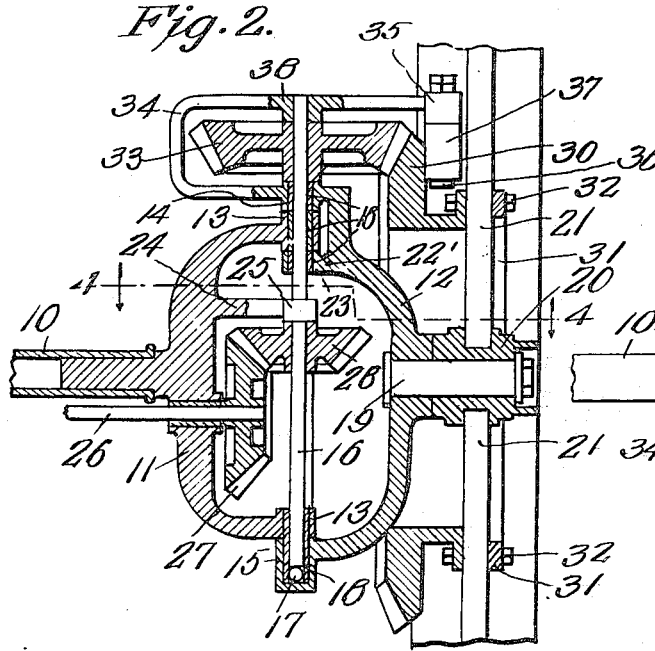
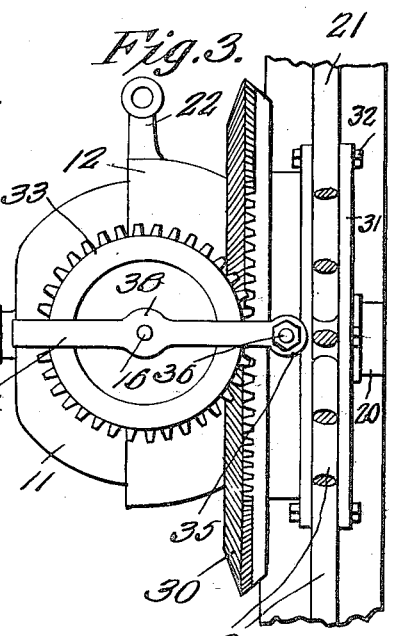
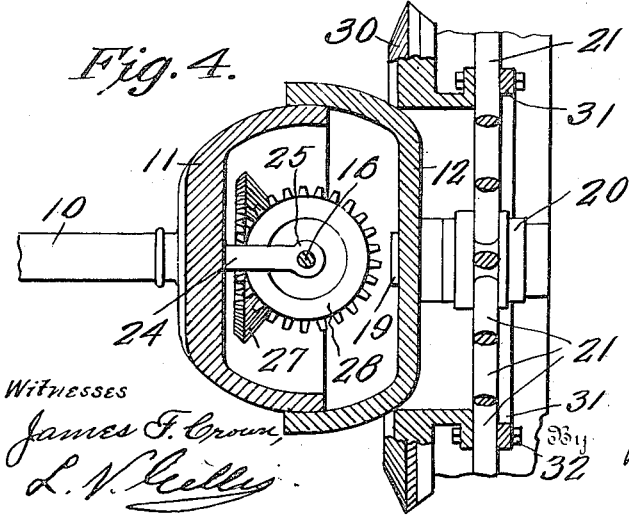
Witnesses
James F. Crown
L. V. Gillis
Inventor
E. M. Sauder,
Attorneys

UNITED STATES PATENT OFFICE.

EMANUEL M. SAUDER, OF WAUSEON, OHIO.

FRONT-WHEEL DRIVE.

1,224,504. Specification of Letters Patent. Patented May 1, 1917.

Application filed September 5, 1916. Serial No. 118,479.

*To all whom it may concern:*

Be it known that I, EMANUEL M. SAUDER, a citizen of the United States, residing at Wauseon, in the county of Fulton, State of Ohio, have invented certain new and useful Improvements in Front-Wheel Drives; and I do hereby declare the following to be a full, clear, and exact description of the invention, such as will enable others skilled in the art to which it appertains to make and use the same.

This invention relates to automobiles and has special reference to a front drive for the steering wheels of automobiles.

One object of the invention is to provide an improved and simplified general construction of devices of this character.

A second object of this invention is to provide a novel form of steering knuckle wherein the driving and driven gears will be held together in an improved manner.

A third object of the invention is to provide a novel arrangement of steering knuckle and drive for the front wheels of an automobile, the driving mechanism being so arranged that no part thereof extends through the front axle body.

With the above and other objects in view, as will be hereinafter apparent the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a front elevation of a portion of a front axle employing the improved mechanism.

Fig. 2 is a vertical median section through the steering knuckle of such a front axle and showing the interior of the casing.

Fig. 3 is a plan view of the parts shown in Fig. 2.

Fig. 4 is a detail section on the line 4—4 of Fig. 2.

In carrying out the objects of the invention and in the embodiment herein disclosed there is provided the front axle 10 which carries at each end a steering knuckle member or casing 11. This steering knuckle member or casing coöperates with a second steering knuckle member or casing 12, the casing 11 being provided with alined bosses 13 while the casing 12 is provided with bosses 14 and 15. Through the bosses 13 and 14 and extending into the boss 15 is a shaft 16. This lower boss 15 forms a foot step bearing for said shaft 16 and may, if desired, be provided with an anti-friction ball 17 for the purpose of reducing the friction. The different bosses are also preferably provided with anti-friction bushings 18. Fixed to the member 12 is a stub shaft 19 whereon is mounted the hub 20 of a wheel, this wheel being provided with the usual spokes 21. Thus the wheel is free to rotate about the axis of the shaft 16 and to accomplish this rotation the usual steering arm 22 is provided on the member 12. Extending inward from the member 12 is an arm 22' which carries a bearing boss 23 for the shaft 16 and extending inward from the member 11 is a similar arm 24 carrying a bearing boss 25 for said shaft. Extending through the wall of the member 11 is a driving shaft 26 which carries on the end within the member a bevel gear 27 which meshes with a similar bevel gear 28 the latter being prevented from moving away from the gear 27 by the boss 25. This driving shaft 26 has connected thereto a main driving gear 29 which is in turn connected to suitable transmission mechanism not deemed necessary here to be shown as any mechanism of this type may be used.

The wheel spokes 21 have secured thereto an annular beveled gear 30 which has its outer portions spaced from these spokes as clearly seen in Fig. 2. This gear is secured to the wheel by any preferred means, as for instance by the clips 31 and bolts 32. This gear 30 meshes with a beveled gear 33 fixed upon the upper end of the shaft 16 and extending around the gear 33 is an arm 34 which projects at its upper end toward the wheel and is provided adjacent said wheel with a boss 35 through which extends a shaft 36 whereon is revolubly mounted a roller 37 bearing against the back of the gear 30 at a point opposite the point of contact of said gear 30 with the gear 33. By means of this construction the gears 30 and 33 are prevented from slipping out of mesh and are at all times held properly in engagement. The arm 34 is likewise provided with a boss 38 wherein the upper end of the shaft 16 is received.

It will be obvious that in the smaller sizes of the device, the arm 24 may be omitted, the boss 23 being sufficient to hold the gear 28 in mesh with the gear 27.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

1. In a device of the kind described, a wheel, a bevel gear mounted on said wheel and having its rim spaced therefrom, a steering knuckle casing member supporting said wheel, an arm projecting from the member in the direction of the wheel, a roller carried by the arm and engaging the back of the gear, and a second bevel gear supported by the member and meshing with the first gear opposite the roller.

2. In a device of the kind described, a wheel, a bevel gear mounted on said wheel and having its rim spaced therefrom, a steering knuckle casing member supporting said wheel, an arm projecting from the member in the direction of the wheel, a roller carried by the arm and engaging the back of the gear, a second casing member, a shaft extending vertically through the casing members and forming a pivot therefor, a second bevel gear fixed to the upper end of the shaft and meshing with the first gear opposite the roller, a third bevel gear fixed to said shaft within the casing members, a driving shaft journaled in the wall of the second casing member, and a driving gear fixed to the driving shaft and meshing with said third gear.

In testimony whereof, I affix my signature, in the presence of two witnesses.

EMANUEL M. SAUDER.

Witnesses:
 DANIEL MULL,
 WILLIAM SAUDER.